(No Model.) 7 Sheets—Sheet 1.

L. K. JOHNSON & A. A. LOW.
TYPE DISTRIBUTING APPARATUS.

No. 356,840. Patented Feb. 1, 1887.

Witnesses:
Wm. Gardner
Wm. A. Pollock

Inventors
Louis K. Johnson,
A. Augustus Low,
By their Attorney,
Geo. W. Miatt (No Model.) 7 Sheets—Sheet 3.

L. K. JOHNSON & A. A. LOW.
TYPE DISTRIBUTING APPARATUS.

No. 356,840. Patented Feb. 1, 1887.

(No Model.) 7 Sheets—Sheet 4.

L. K. JOHNSON & A. A. LOW.
TYPE DISTRIBUTING APPARATUS.

No. 356,840. Patented Feb. 1, 1887.

(No Model.) 7 Sheets—Sheet 5.

L. K. JOHNSON & A. A. LOW.
TYPE DISTRIBUTING APPARATUS.

No. 356,840. Patented Feb. 1, 1887.

(No Model.) 7 Sheets—Sheet 6.

L. K. JOHNSON & A. A. LOW.
TYPE DISTRIBUTING APPARATUS.

No. 356,840. Patented Feb. 1, 1887.

(No Model.) 7 Sheets—Sheet 7.

L. K. JOHNSON & A. A. LOW.
TYPE DISTRIBUTING APPARATUS.

No. 356,840. Patented Feb. 1, 1887.

Witnesses:
Wm Gardner
Wm A. Pollock

Inventors:
Louis K. Johnson
A. Augustus Low
By their Atty
Geo. W. Miatt

UNITED STATES PATENT OFFICE.

LOUIS K. JOHNSON AND A. AUGUSTUS LOW, OF BROOKLYN, ASSIGNORS TO THE ALDEN TYPE MACHINE COMPANY, OF NEW YORK, N. Y.

TYPE-DISTRIBUTING APPARATUS.

SPECIFICATION forming part of Letters Patent No. 356,840, dated February 1, 1887.

Application filed October 6, 1884. Serial No. 144,776. (No model.)

*To all whom it may concern:*

Be it known that we, LOUIS K. JOHNSON and A. AUGUSTUS LOW, citizens of the United States, residing in the city of Brooklyn, in the county of Kings and State of New York, have invented certain new and useful Improvements in Type-Distributing Apparatus, of which the following is a full, clear, and exact description, sufficient to enable those skilled in the art to make and use the same.

Our invention relates to that class of distributing apparatus heretofore devised by us, in which the types are distributed by hand into a central bank of receivers, from which the type-containing channels extend outward upon either side in two series, the type being forwarded in both series of containing-channels by a double vibrating pusher situated underneath the receiving-bank.

Our present improvements are designed to make the apparatus more convenient and accessible in use and more accurate in operation.

The convenient and rapid disposition of the large quantities of spaces necessarily employed in all composition has heretofore been a serious problem in distribution. They are so numerous that if deposited in the usual type-containing channels the latter are filled up, and have to be removed and replaced so frequently as to be a source of annoyance and delay. Besides, since it is immaterial which end of a space is uppermost in composition, their arrangement in prescribed positions is superfluous, and for this reason they are deposited loosely in comparatively large raceways or compartments in the compositor's case, as shown and described in our application No. 91,047. We therefore construct an appropriate number of space-receivers in the middle of our receiving-bank, which are connected with the under side of the table by suitable conduits, through which the spaces descend into comparatively large receptacles, from which the spaces may be dumped directly into the upper ends of the space-compartments in the "setter" before referred to.

In order to adapt the apparatus to the distribution of all classes and sizes of type without removal and substitution of the parts, it is essential that the degree of penetration of the pusher-fingers into the type-containing channels should be susceptible of delicate and accurate adjustment, and this is of especial importance where very small light types are being distributed. For this reason we make the two combs or series of pusher-fingers of the duplex type-forwarder independently adjustable. In order to facilitate this adjustment of the duplex type-forwarder and avoid the necessity for removing any portion of the apparatus in order to accomplish it, we suspend the conduit-plates in such manner that they may be turned inward to give access to the adjusting devices upon the forwarder. Another advantage attained by thus making the conduit-plates movable is that they may be swung back away from the receiving-plates and the type-containing channels, in order to remedy any possible obstruction, clogging, or disarrangement in the types. For a similar reason the receiver-plates are so mounted that they may be slid bodily back away from their conduit-plate, and they are also hinged together, so that the upper plates may be raised to give access to those below without removal or detaching.

In order to facilitate the distribution of the type, it is desirable that their receivers should approximate as nearly as possible a cup or trumpet shape at their mouths, so that inclined guiding-surfaces which gradually merge into the type-passages shall surround the types upon all sides. To this end we form the under sides of the superimposed receiver-plates with flared recesses which coincide with and constitute continuations upward of the receivers formed in the faces of the plate next immediately below. With the same object in view we enlarge the upper side walls of the conduits upon the opposite or right-hand side of the bank, and practically convert their upper ends into elongated cup-shaped receivers by applying to the face of these enlarged upper side walls a combined guide-surface and face-plate, which effectually counteracts any tendency of the types to rebound out of the conduits and insures their descent upon the floor of the conduits, even though they may enter the receivers thus formed at an inappropriate angle; but the portion of the apparatus in which the greatest difficulty has heretofore been experienced in controlling the types is at their point of transfer from the conduits to the receiving-channels. The types necessarily have to drop some distance before their heels encounter the floors of the type-containing channels, and are hence, especially in the case of the lighter types, liable to rebound out of the channel, or in such manner as to turn upon their longitudinal axes. Owing, also, to the continuous vibration of the type-forwarder, they are apt to descend upon the type-fingers while the latter are in the containing-channels, in which case the motion of the pusher-fingers has a tendency to disarrange them. We overcome these difficulties by the use of adjustable guards placed near the lower edges of the conduit-plates, and immediately over the positions of the types as they descend into the type-containing channels. These guards prevent the types rebounding from the channels and cause them to drop back into position to be raised and forwarded by the pusher, and if any of the types descend upon the pusher-fingers they hold them against displacement until the pusher-fingers are retraced, and then allow them to drop into position in the type-channels.

Our invention also includes certain special forms of construction, hereinafter described.

In the accompanying drawings.

In the drawings, the table or bed A, only a portion of which is shown, is supposed to be supported in any usual or convenient manner. This table is designed to be of sufficient area to accommodate two complete banks or systems of type-receivers, containing-channels, &c., arranged parallel to each other upon opposite sides of the table, but reversed in position thereon, so that the operators face each other while distributing into the apparatus, as in our recent application (No. 131,261) for patent.

In the drawings, however, only a single bank or system of receivers is illustrated, the novel features of construction being adapted equally to either a single or double distributer.

The receiving-bank B is mounted upon the central portion of the table A, and consists of a series, C, of receiving-plates $C'\ C^2\ C^3$, connecting with a conduit-plate, D, which transfers the types from the receivers C into the containing-channels E upon one side, and of a combined receiver and conduit-plate, F, which receives the types and conducts them directly into the containing-channels E upon the other side. This general arrangement of the parts is substantially the same as that shown and described in the application for patent before referred to, the conduit-plates being set at opposed angles back to back; but in the present case, instead of the plates D F being permanent and rigid in position, they are hinged or pivoted so as to be capable of swinging toward each other until they assume a vertical position, or nearly so. This is for the twofold purpose of giving ready access to both the lower portions of the type-receivers $C'\ C^2\ C^3$ and to the vibrating pusher G, when necessary either to remove any obstruction or clogging in the receivers or in order to adjust the pusher-combs with relation to each other, as hereinafter described.

Figure 1:
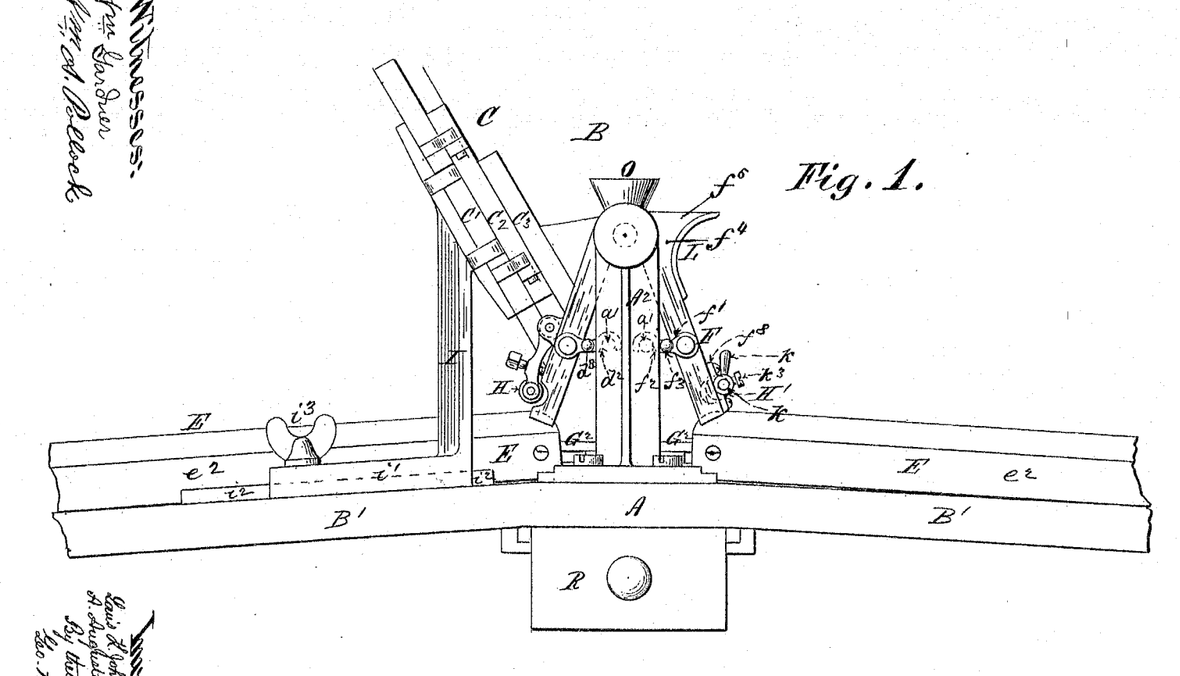
Figure 1 represents a front elevation of the larger portion of a distributer-table embodying our improved construction, the right-hand portion of the table being broken away.
Figures 3, 4, 5:
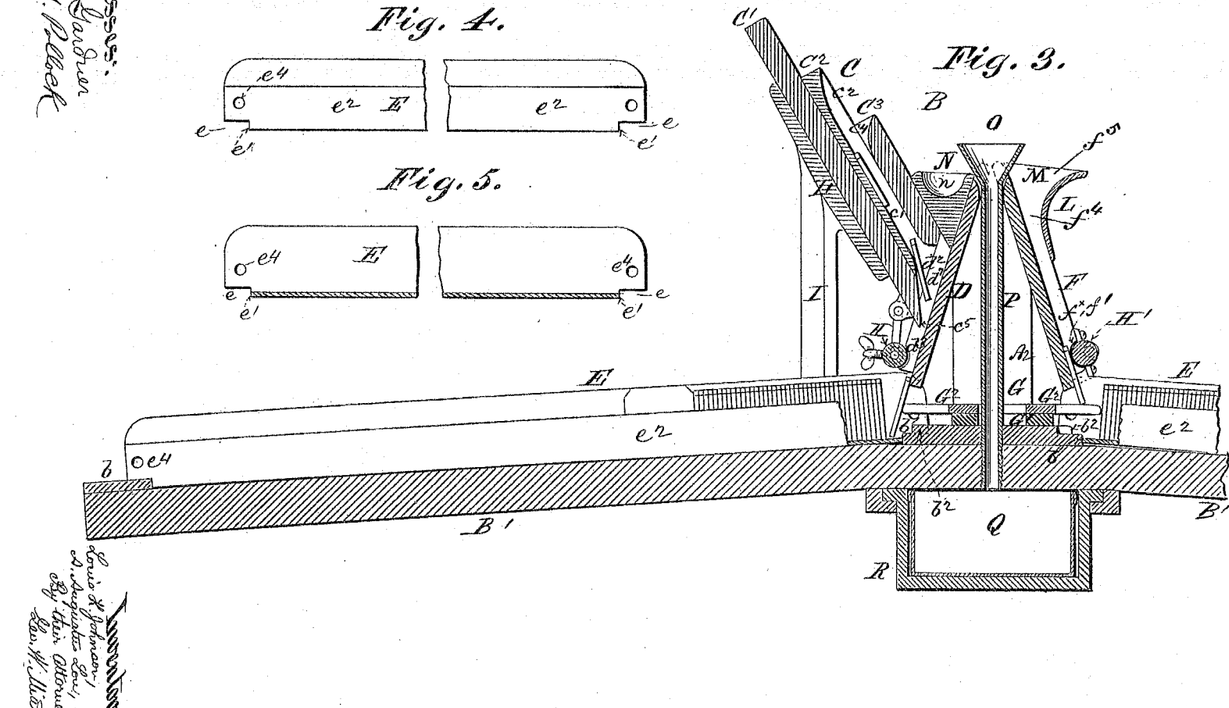
Fig. 3 is a longitudinal sectional elevation of the parts shown in Fig. 2.
Fig. 4 is an elevation of one of the type-containing channels with its central portion broken away.
Fig. 5 is a longitudinal section of the parts of the type-containing channel shown in Fig. 4.

The surfaces of the table A are preferably inclined downward and outward from the receiver-bank B, as shown in Figs. 1 and 3 at B' B', for the purpose of affording inclined supports for the two divisions of type-containing channels E. This inclination need be sufficient only to prevent the types from falling back or following the fingers of the pusher-bar G during its retractile movement—that is to say, such that each succeeding type will lean steadily against the type next immediately preceding it.

The type-containing channels E are held in position upon the table against longitudinal displacement or play by the transverse shoulders or seats $b\ b'$, the channels E being formed with a notch or offset, $e\ e$, at each extremity, which allows the shoulders, $e'\ e'$, thus formed to drop between and engage with the said transverse shoulders $b\ b'$ upon the table. The seats $b'$ for the ends of the type-containing channels immediately under the receiving-bank are formed with vertical shoulders or projections $b^2\ b^2$, which enter into and form a means of centralizing and supporting the type-channels, the adjoining side walls of which latter rest against each other and project into the recesses $b^3$, formed by and between the said vertical shoulders $b^2\ b^2$ at this point.

Figures 7, 14:
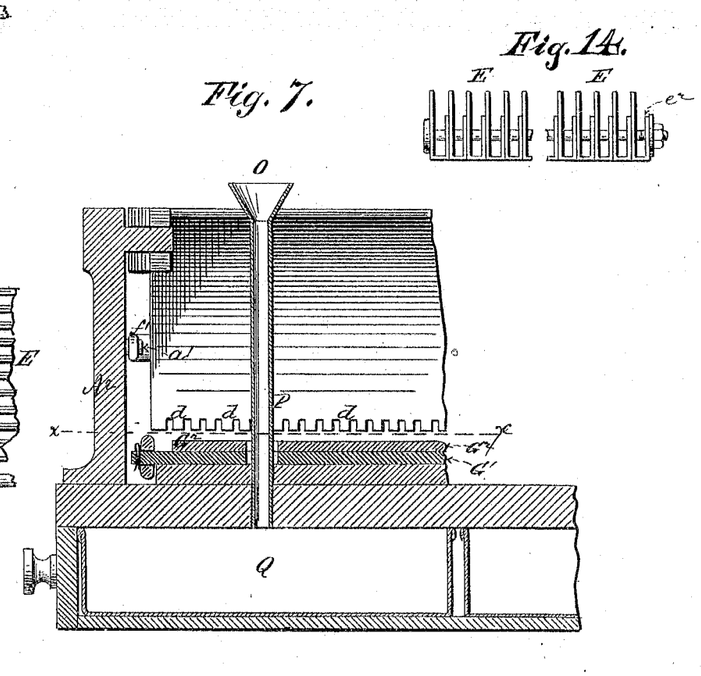
Fig. 7 is a vertical section upon plane of line $y\ y$, Fig. 6, showing one of the space tubes and drawers and the back side of the left-hand conduit-plate.
Fig. 14 is an end view of a series of type-containing channels filled and bolted together for transportation or storage.
Figure 8:
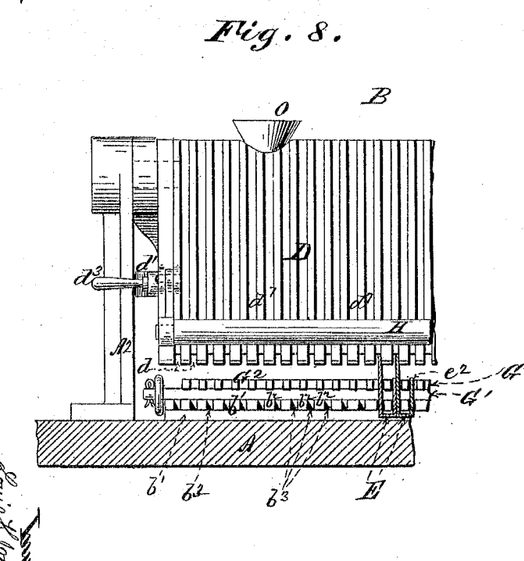
Fig. 8 is a vertical elevation of one extremity of the face of the left-hand conduit-plate with the channel-seats and pusher underneath, and showing a couple of type-containing channels in section, to indicate their position.
Figure 9:
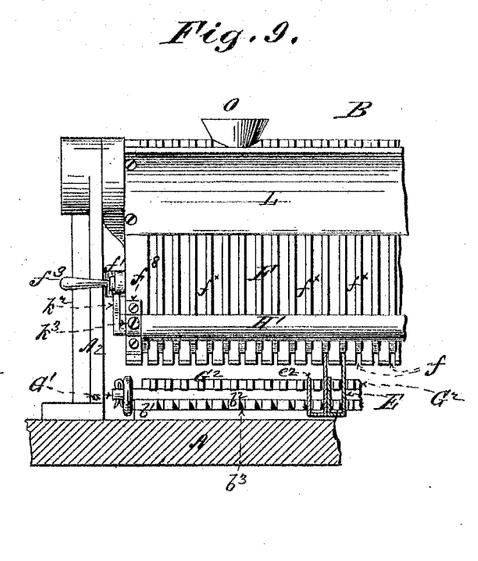
Fig. 9 is a vertical elevation of one extremity of the face of the right-hand conduit-plate with the channel-seats and pusher underneath, also showing a couple of type-containing channels in section.

It is to be observed that the offsets and shoulders $e\ e'$ at both extremities of the type-containing channel E are uniform in shape and dimensions. This is for the purpose of rendering the said type-channels interchangeable, so that they may be used with equal facility upon either the right or left side of the receiver-bank B. The importance of this feature of interchangeability arises from the fact that the types distributed into the channels must all have the same prescribed position with relation to the front or narrower sides, $e^2\ e^2$, of the channels, in order to be available for use in our peculiar form of compositor's case described in our application No. 91,047. Thus by forming both ends of the type-containing channels alike they can be used indiscriminately upon either the right or left hand side of the receiver-bank B, the only difference being that the channels upon the left hand will receive the types into what constitutes the lower end of the channel when placed in the compositor's case, whereas those channels upon the right hand will receive the types into what constitutes the upper extremity of the channel under like circumstances. The type-containing channels E are also formed with perforations $e^4\ e^4$ at both extremities. All the channels are thus perforated, so that when placed together side by side all the perforations coincide with each other, and a rod or bolt or other suitable means of securing the channels together may be made use of, as indicated in Fig. 14, Sheet 4, while removing the filled channels to the compositor's case, or for convenience in storage or transportation.

It is to be observed that the rod, bolt, or even a cord passing through the perforations and securing the type-channels together will also act as a guard to prevent the escape of the types from the ends of the channels.

As shown in the drawings, the opposed conduit-plates D and F are suspended upon and between the vertical standards $A^2\ A^2$ in such manner as to admit of their lower edges being swung toward or from each other. Their lower edges are formed with notches $d\ d$ and $f\ f$, which allow the said lower edges to be swung outward over and into the inner ends of the type-containing channels E, the side walls of which latter, by entering the said notches $d\ d$ and $f\ f$, are thus supported by the conduit-plates against lateral displacement.

The conduit-plates D and F are held in their forward or operative position by any suitable means, that shown in the drawings consisting of hooked levers or braces $d'$ and $f'$, pivoted, respectively, to the plates D and F, and formed with hooks or shoulders $d^2\ f^2$, which engage with studs or projections $a'\ a'$ upon the standards $A^2\ A^2$. These catch-levers or braces $d'$ and $f'$ may be provided with handles $d^3\ f^3$, by which they may be conveniently operated.

Figures 10, 11, 12, 13:
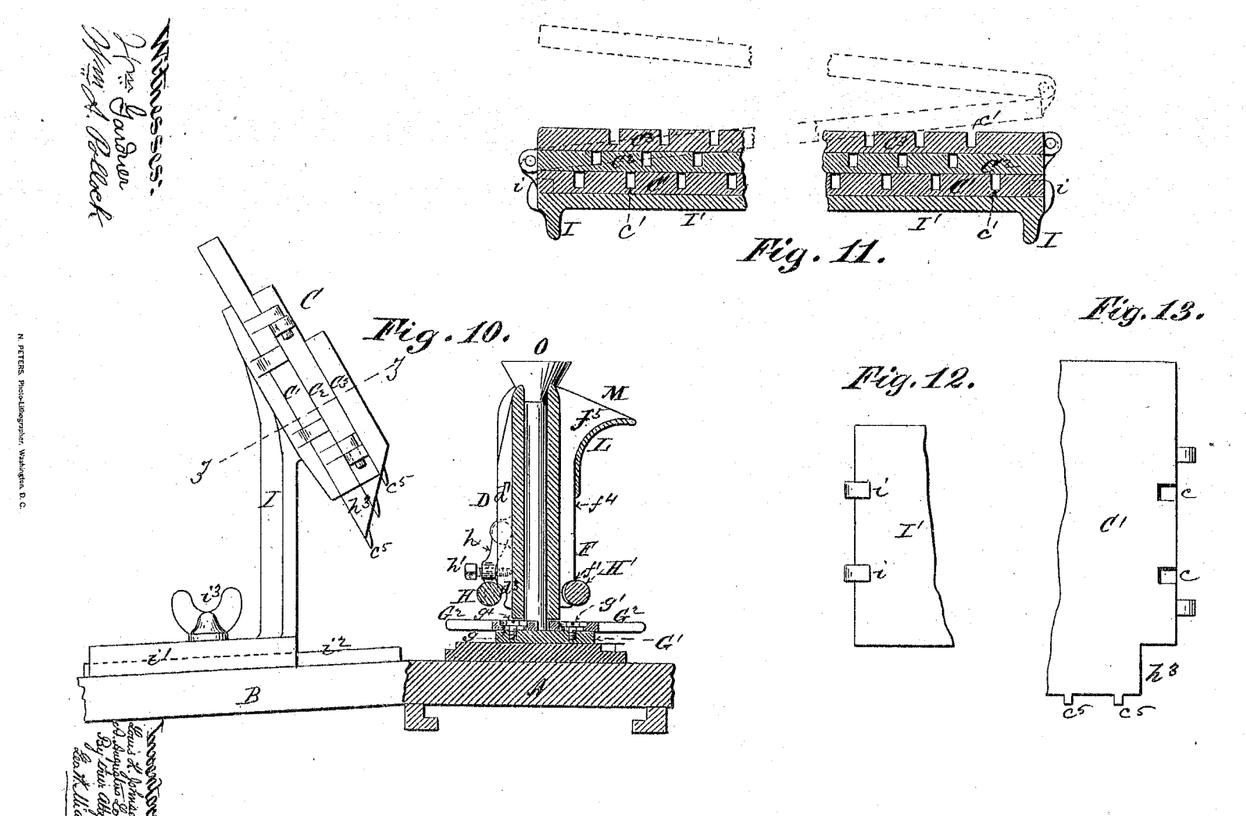
In Fig. 10 the conduit-plates, pusher, &c., are shown in transverse section, while the receiver-plates are shown in end elevation, the conduit-plates being swung back toward each other and the receiving-plates being withdrawn. This view also shows the means of adjusting the combs upon the pusher.
Fig. 11 is a longitudinal section of the receiver-plates, (upon line $z\ z$, Fig. 10, their central portions being broken away,) showing the method of hinging them together, and also showing by dotted lines the upper plates raised.
Fig. 12 is a view of the upper side of one extremity of the plate support or stand, showing the lugs for engaging with the lower plate.
Fig. 13 is a view of the under side of one extremity of the lower plate, showing the recesses into which the lugs upon the supporting-standard enter.
Figure 15:
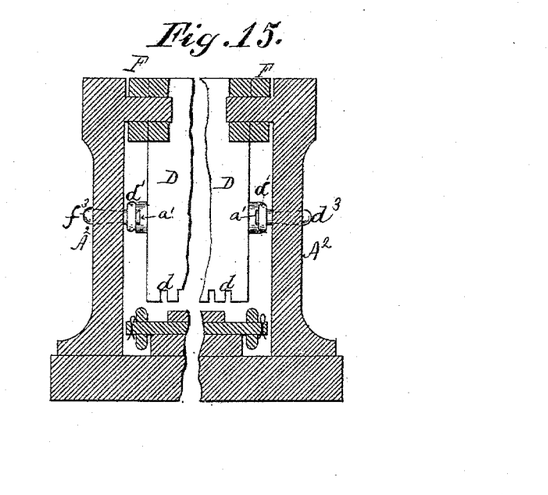
Fig. 15 is a vertical sectional view showing the opposite ends of a conduit-plate.
Figure 16:
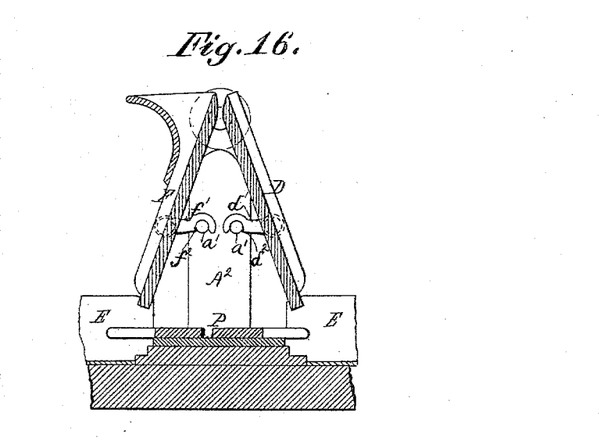
Fig. 16, a sectional view at right angles to Fig. 15, illustrating the means for suspending and supporting the said conduit-plates.

Upon the table A, immediately underneath the conduit-plates D and F, is mounted a double reciprocating type forwarder or "pusher," G, which is operated, as heretofore, by suitable eccentrics or similar devices through connecting-rods $g\ g$, secured to either extremity of the pusher. The peculiarity in our present construction consists in forming the pusher of a reciprocating plate, G', to which are secured so as to be independently adjustable thereon two separate combs or series of pusher-fingers, $G^2\ G^2$—one for each side or division of the receiver-bank. Various means of securing the combs $G^2\ G^2$ adjustably upon the reciprocating bar G' may be employed, that shown in the drawings consisting in forming each comb with two or more elongated slots, $g^5\ g^5$, through which pass set-screws $g'\ g'$, which screw into the reciprocating bar G'. The adjustments thus attained render each side or division of the receiver-bank B independent of the other, and insures an accuracy and delicacy of action which is of especial importance where comparatively small and light type is being operated upon, or where the apparatus is being adapted to a change in the kind of type to be distributed. This adjustment of the pusher combs $G^2\ G^2$ may be effected without the removal of either the pusher or the conduit-plates D and F above by simply raising the braces $d'$ and $f'$ and allowing the plates to swing toward each other, thus giving access to the set-screws $g'\ g'$, as shown in Fig. 10, the pusher-bar G' being moved over to the side desired and the guards H H' swung back or removed, if necessary.

The receiving-plates C, as in our application No. 131,261, are three in number, and are inclined at an angle to the conduit-plate D, with which they communicate when in position for use. In the present construction the receiving-plates are mounted upon and between standards I I, which are adjustable longitudinally upon the table A. The standards I I are preferably connected by a web, I', although this latter may be dispensed with, if preferred, and the first or lower plate, C', may be secured directly to the standards.

As shown in the drawings, the lower plate,

C′, is formed with notches $c\ c$ upon its under side, which engage with supporting lugs or shoulders $i\ i$ upon the standards I I, by which means the plates are held in position by gravity only, and may be readily removed when necessary. The feet or bases $i\ i$ of the standards I I rest upon and straddle rails $i^2\ i^2$ upon the top of the table A, and are secured thereon by set-screws $i^3\ i^3$, passing through longitudinal slots $i^4\ i^4$ in the said feet $i\ i$.

Figure 2:
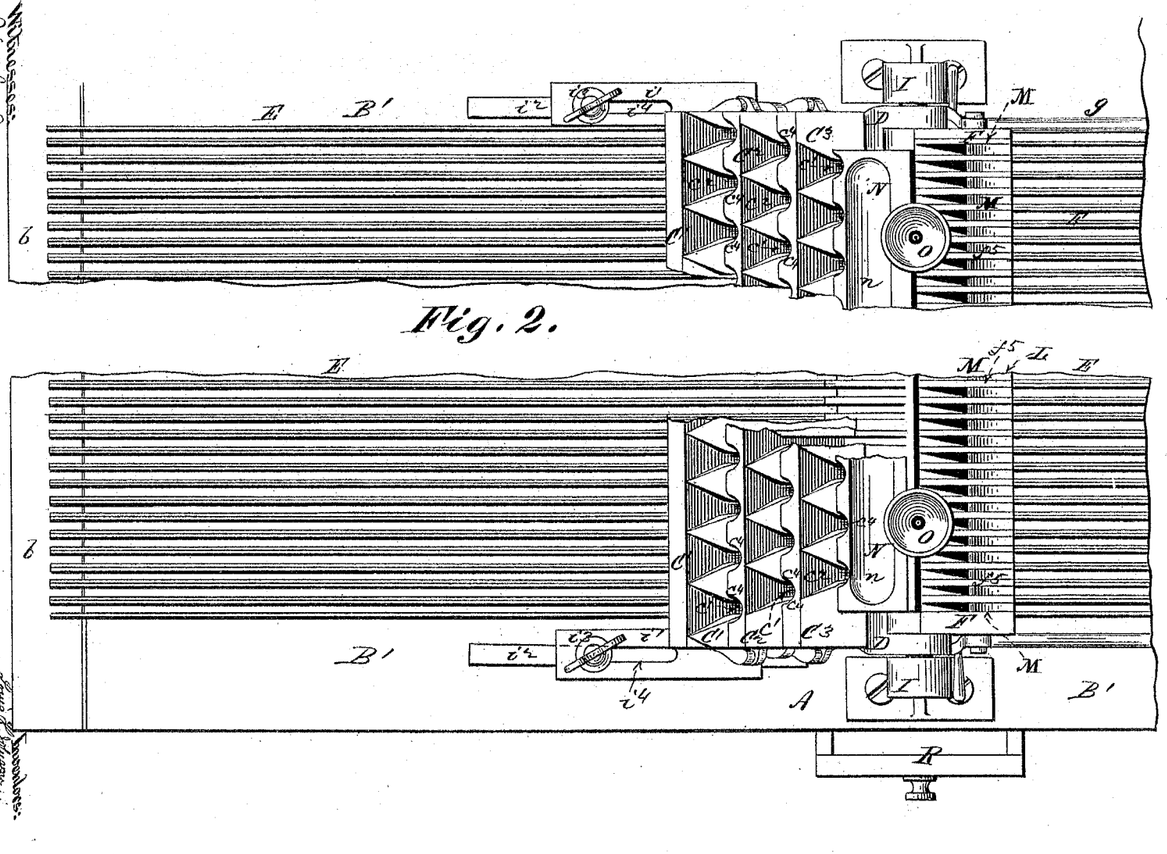
Fig. 2 is a plan of portions of the distributer-table, showing the extremities of the duplex receiver-bank, the intervening central portion of the said receiver-bank, &c., being omitted.

The several plates C′ C² C³ are secured together by hinging the bottom and top plate, C′ and C³, to the middle plate, C², at its opposite extremities, as shown in Fig. 11. This permits the plates to be lifted or swung one from the other, as indicated by dotted lines, for the purpose of gaining access to the type passages $c'\ c'$, formed in the upper sides of each plate, and leading from the receivers $c^2\ c^2$ to the conduits $d^7\ d^7$ in the face of the conduit-plate D. These type receivers and channels $c^2\ c'$, formed in the plates C′ C² C³, coincide and communicate in order with the conduits $d^7\ d^7$ when brought into position against the conduit-plate D—that is to say, the channels $c\ c'$ in the first or lower receiver-plate, C′, communicate in order with the first, fourth, seventh, and tenth conduits $d^7$, those in the middle or second plate, C², with the second, fifth, eighth, and eleventh conduits $d^7$, and those in the third or top plate, C³, with the third, sixth, ninth, and twelfth conduits $d^7$, respectively, and so on to the end of the series. This arrangement of the receivers, &c., in the plates C′ C² C³ is substantially the same as that shown in our application No. 131,261, before referred to; but in the present case we construct the upper edges of the two upper plates, C² C³, with concavities or mouths $c^4\ c^4$, which coincide in position with the type receivers $c'\ c^2$, and curve inward and downward until they merge into the latter, as shown in Figs. 2 and 3. These concavities or mouths $c^4$, in conjunction with the depressed receivers $c^2$, greatly facilitate the introduction of the types into the narrower channels, $c'$, on their way to the conduits $d^7$ in the conduit-plate D, and enable the operator to drop the types into their respective receivers with less regard to the position which they may assume while entering the latter.

The floors of the type-passages $c'$, at a distance from the floors of the conduits $d^7$ equal to about two-thirds the length of a type, suddenly incline downward toward the bottom of the conduit-plate D, as shown at $d^2$ in Fig. 3, the plates underneath at these points being formed to constitute continuations of the floors of the passages $c'$, and projecting into the conduits $d^7$ a distance sufficient to leave only space above the floors of the said conduits $d^7$ but little wider than the thickness of the types. The object of this sudden change in inclination in the floors of the passages $c'$ is to cause the types to commence to turn directly their centers of gravity pass beyond that point, so that their heels shall not encounter the floors of the conduits $d^7$ at too acute an angle, thus avoiding all rebound, and lessening the danger of the types clogging or turning upon their longitudinal axes. The under sides of the upper plates may be chamfered off at these points, if necessary, as shown in Fig. 3, to allow the heads of the types to turn freely.

The projecting tongues $c^5$, formed by the continuations of the floors of the passages $c'$ into the conduits $d^7$, insures the descent of the type through the said conduits upon their flat or broad sides. After passing under the tongues $c^5$ the types are still prevented from turning upon their longitudinal axes by a guard rail or roller, H, situated just above the lower edge of the conduit-plate D. A similar guard, H′, is arranged just above the lower edge of the right-hand conduit-plate F, the action in both cases being the same. These guard-rails H and H′ not only prevent the type from turning while passing under them, but they also prevent the types from rebounding out of the containing-channels below. Again, should a type descend while the pusher-fingers were forward in the channels and rest with its heels upon the pusher-fingers, the guards H or H′, as the case might be, would retain it in such position against the motion of the pusher until the pusher-fingers were withdrawn, when the type would slide down into position in the channel, ready to be forwarded by the next vibration of the pusher. Under like circumstances, supposing the guards H or H′ were not provided, the heel of the type would be carried forward upon the advancing pusher-finger, and upon the retractile movements of the latter the type in tumbling into the channel would almost invariably be deranged. These guards H and H′ are preferably made in the form of cylindrical rods or rollers, secured at opposite extremities to the faces of the conduit-plates, although the guard H for the left-hand conduit-plate, D, may be suspended from the receiver-plates, if preferred, as indicated in Fig. 3, so that when the latter are moved back from the center, as shown in Fig. 10, for the purpose of gaining access to the pusher G, the said guard H will be entirely out of the way; but we prefer in most cases to attach both guards H and H′ to the faces of the conduit-plates D and F in such manner that their convex surfaces may be adjusted toward or from the floors of the conduits to regulate the space through which the types must pass according to the thickness of the types being distributed, and to this end the side walls of the conduits are formed with depressions $d^3$ and $f'$ opposite the guards H and H′. This adjustment may be accomplished in several ways. For instance, the guard H′ for the right-hand conduit-plate, F, is shown as consisting of a long eccentric, the journals $k$ of which are mounted in bearings $f^8$ at either extremity of the conduit-plate F. The eccentric H′ is provided with a handle or lever, $k^2$, at one end, by which it may be turned so as to project more or less into the conduits $f$, and with a set-screw, $k^3$, passing through one of the bearings $f^2$, by which it may be secured in the required position.

The guard-roller H upon the left-hand conduit-plate, D, is shown as mounted between swinging arms $h\ h$, which are pivoted to the face of the conduit-plate D above. Set-screws $h'$ pass through these arms $h$ and bear against the conduit-plate D, and thus furnish a means of regulating the penetration of the guard-roller H, which latter, by gravity, tends constantly to enter the conduits $d'$. The lower extremities of the receiver-plates C' and $C^2$ are recessed or cut away above the position of the swinging arms $h\ h$, as shown at $h^3$, Figs. 10 and 13, so as to give the latter free play. The upper extremities, $f^5$, of the side walls, $f^4$, of the conduits $f^x\ f^x$ upon the right hand conduit-plate, F, are formed so as to extend outward considerably beyond the height of the lower portion of the walls, and are provided with a face plate or guide, L, which conforms to the shape of the upper side walls, $f^5$, as shown in Figs. 1, 2, 3, 9, and 10. By this construction we obtain what are practically a series of elongated cups or receivers, M, upon this side of the receiver-bank B, into which the types may be dropped with greater convenience and celerity than heretofore, the guide-plate L insuring the descent through the conduits of all types dropped therein, guiding those that may not have been dropped in the most favorable position, and effectually preventing any rebound or escape from the conduit after the type has once entered.

Should a type fail to enter a receiver M, it is supported by the enlarged side walls, $f^5\ f^5$, in a position from which it can be conveniently picked up and the mistake rectified. In this connection we desire to call attention to the combined top plate and tray, N, which rests against and in the angle formed by the junction of the upper receiving-plate, $C^3$, and the left-hand conduit-plate, D, as shown in Figs. 1 and 2. The under side of this top plate or tray is formed with the curved recesses or mouths $c^4$, coinciding with the receivers $c^2$ in the upper receiving-plate, $C^3$, the type-passages $c'$ in which it covers and incloses in the same manner as the upper receiving-plate incloses the passages in those below. The upper side of this angle-plate N is formed with an elongated depression or gutter, $n$, into which any peculiar and infrequently used denominations of type which are not provided for in the distributer may be temporarily deposited, and which also acts as a receptacle for all types that may be inadvertently dropped during distribution.

The receivers for the "spaces" are situated above and between the two conduit-plates D and F, and are in the form of funnels or cups O, from the lower positions of which conducting-tubes P extend downward between the said conduit-plates D and F, passing through the pusher G, the table A, and communicating with a drawer or other receptacle, Q, arranged upon the under side of the latter for the reception and storage of the spaces.

The position of the "space-receivers" between the two divisions of the bank is especially advantageous and convenient, since whichever side of the bank is being distributed into there are always sure to be a greater or less number of spaces to dispose of. The tubes P may be secured in position in any convenient manner, that shown in the drawings consisting in forming their lower extremities with a screw-thread, by which they are secured to the table.

Figure 6:
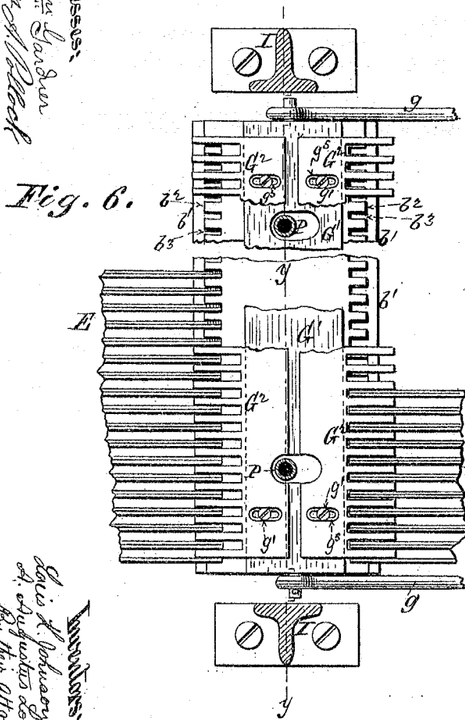
Fig. 6 is a sectional view taken on plane of line $x\ x$, Fig. 7, showing a plan of the vibrating pusher, the channel-seats, &c.

As will be seen by reference to Figs. 3 and 6, the pusher-bar G' and its combs $G^2$ are slotted out at the points where the tubes pass through, to allow the reciprocation of the pusher without its coming in contact with the tubes.

Any desirable form of receptacle may be arranged underneath the table for the reception of the spaces; but we prefer to provide one or more drawers, R, in which are arranged a suitable number of independent boxes, Q, which may be removed bodily with their contents from time to time and others substituted in their place.

What we claim as our invention, and desire to secure by Letters Patent, is—

1. In a type distributing apparatus substantially such as designated, a type-conduit plate intermediate between the receivers and the type-containing channels pivotally supported upon a stationary part of the apparatus above the type-forwarding mechanism, and adapted to be swung back to give access to such mechanism, or to the ends of the receiver-conduits or containing-channels, in combination with such receivers, type-forwarding mechanism and containing-channels, and with means, substantially as described, for sustaining the plate in its normal position, substantially in the manner and for the purpose described.

2. The two conduit-plates formed with conduits by which the types are conveyed upon their flat sides to the type-containing channels, said plates being pivotally supported upon a stationary part of the apparatus, back to back, over the position of the type-forwarding mechanism, in combination with the latter, the type-containing channels, and means, substantially as described, for sustaining the said plates in their normal positions, substantially in the manner and for the purpose described.

3. A series of superposed type-receiving plates mounted upon standards which are movable longitudinally upon the frame of the apparatus, in combination with a type-conduit plate formed with type-passages which coincide with those in the receiving-plates when the latter are in position against the said conduit-plate, and with suitable type-containing channels and mechanism, substantially as described, for forwarding the types therein, substantially in the manner and for the purpose described.

4. In a type-distributing apparatus in which a series of superposed type-receiving plates are combined and arranged with an intermediate conduit-plate, type-containing channels, and type-forwarding mechanism, substantially as and for the purpose described, a frame or support for the said superposed receiving-plates, formed with bases or feet which engage rails or ways extending at right angles to the intermediate conduit-plate, in combination with the latter, for the purpose and substantially in the manner described.

5. The combination, with an intermediate conduit-plate, type-containing channels, and type-forwarding mechanism, substantially as described, of a series of superposed type-receiving plates formed with type-channels which coincide with those in the said intermediate conduit-plate and are hinged together at opposite extremities, substantially in the manner and for the purpose described.

6. The superimposed receiving-plates formed upon their upper sides with the type-receivers and type-passages described and upon their under sides with the flaring recesses or mouths which coincide with the type receivers and passages in the plate next immediately underneath, substantially in the manner and for the purpose described.

7. The superimposed receiving-plates formed with the type-receivers and the inclined passages, the lower portions of which are formed with a drop or difference in angle of inclination opposite to and adjoining the conduit-plate, in combination with the latter, for the purpose and substantially in the manner described.

8. In combination with the superimposed receiving-plates and with the conduit-plate, the combined top plate and tray formed upon its under side with the flaring recesses or mouths which coincide with the type-passages in the receiving-plate underneath and upon its upper side with a longitudinal groove or depression, substantially in the manner and for the purpose described.

9. In combination with the conduit-plates, the type-controlling guards made adjustable with relation to the floors of the conduits, for the purpose described.

10. In combination with a conduit-plate, a type-controlling guard arranged opposite its lower portion, which guard consists of an eccentric, constructed and operating substantially in the manner and for the purpose described.

11. The type forwarder or pusher provided with two separate combs or systems of pusher-fingers which act in opposite directions and which are independently adjustable, for the purpose and substantially in the manner described.

12. The double vibrating type-forwarder shown and described, consisting of the vibrating bar upon which are mounted the two combs, which are secured to the vibrating bar by set-screws which pass through elongated slots formed in the backs of the combs, substantially in the manner and for the purpose described.

13. The space-receivers situated above and between the conduit-plates and provided with tubes or conduits which convey the spaces to the under side of the table, combined and arranged with the said conduit-plates and with the type-forwarding mechanism, substantially in the manner and for the purpose described.

14. In combination with the type-conduit plates, space-receivers, and type-forwarding mechanism, arranged substantially as and for the purpose described, one or more receptacles arranged under the table of the apparatus so as to coincide with and receive the spaces from the space-conduits above, substantially in the manner and for the purpose described.

15. In combination with the conduit-plates, space-receivers, and type-forwarding mechanism, arranged substantially as and for the purpose described, a drawer underneath the table of the apparatus, which coincides with and extends under the said space-conduits, and is provided with removable boxes or compartments for the reception of the spaces, substantially in the manner and for the purpose described.

16. A type-containing channel formed with perforations through its side walls at both extremities, for the purpose described.

LOUIS K. JOHNSON.
A. AUGUSTUS LOW.

Witnesses:
GEO. W. MIATT,
WM. GARDNER.